US008006905B2

(12) United States Patent
Jolivet et al.

(10) Patent No.: US 8,006,905 B2
(45) Date of Patent: Aug. 30, 2011

(54) METHOD OF REDUCING NOISE IN AN OPTICALLY READ IMAGE USING AN OPTICAL COLLECTION DEVICE

(75) Inventors: Denis Jolivet, Labege Cedex (FR); Alain Gillet, Labege Cedex (FR)

(73) Assignee: Intermec IP Corp., Everett, WA (US)

( * ) Notice: Subject to any disclaimer, the term of this patent is extended or adjusted under 35 U.S.C. 154(b) by 320 days.

(21) Appl. No.: 12/426,122

(22) Filed: Apr. 17, 2009

(65) Prior Publication Data
US 2010/0294838 A1   Nov. 25, 2010

Related U.S. Application Data

(60) Provisional application No. 61/046,289, filed on Apr. 18, 2008.

(51) Int. Cl.
*G06K 7/10* (2006.01)
(52) U.S. Cl. ............... 235/454; 235/462.07; 235/462.45
(58) Field of Classification Search ................. 235/454, 235/462.01, 462.07, 462.45, 472.01
See application file for complete search history.

(56) References Cited

U.S. PATENT DOCUMENTS

| | | | |
|---|---|---|---|
| 4,128,760 A | 12/1978 | Del Signore, II | |
| 4,303,855 A | 12/1981 | Bapst et al. | |
| 4,694,182 A | 9/1987 | Howard | |
| 4,851,689 A | 7/1989 | Hasegawa et al. | |
| 5,029,276 A | 7/1991 | Buehler et al. | |
| 5,036,187 A | 7/1991 | Yoshida et al. | |
| 5,117,099 A | 5/1992 | Schmidt et al. | |
| 5,287,340 A | 2/1994 | Chapman et al. | |
| 5,376,783 A | 12/1994 | Vecht et al. | |
| 5,410,145 A | 4/1995 | Coroy et al. | |
| 5,600,119 A * | 2/1997 | Dvorkis et al. | 235/462.1 |
| 5,949,056 A | 9/1999 | White | |
| 5,973,313 A | 10/1999 | Redford et al. | |
| 6,889,903 B1 * | 5/2005 | Koenck | 235/462.01 |
| 2006/0076417 A1 | 4/2006 | Massieu | |
| 2008/0179402 A1 * | 7/2008 | Barkan et al. | 235/462.41 |
| 2009/0167676 A1 * | 7/2009 | Edwards et al. | 345/102 |

* cited by examiner

*Primary Examiner* — Daniel St.Cyr
(74) *Attorney, Agent, or Firm* — Perkins Coie LLP

(57) ABSTRACT

A system and method of reading an indicia and rejecting ambient light is disclosed. An imaging signal and an ambient signal are received by the system where the imaging signal corresponds to indicia information and a first portion of the ambient light, and the ambient signal corresponds to a second portion of the ambient light. The imaging signal and the ambient signal are mathematically manipulated to subtract the contribution of the first portion of the ambient light from the imaging signal.

19 Claims, 7 Drawing Sheets

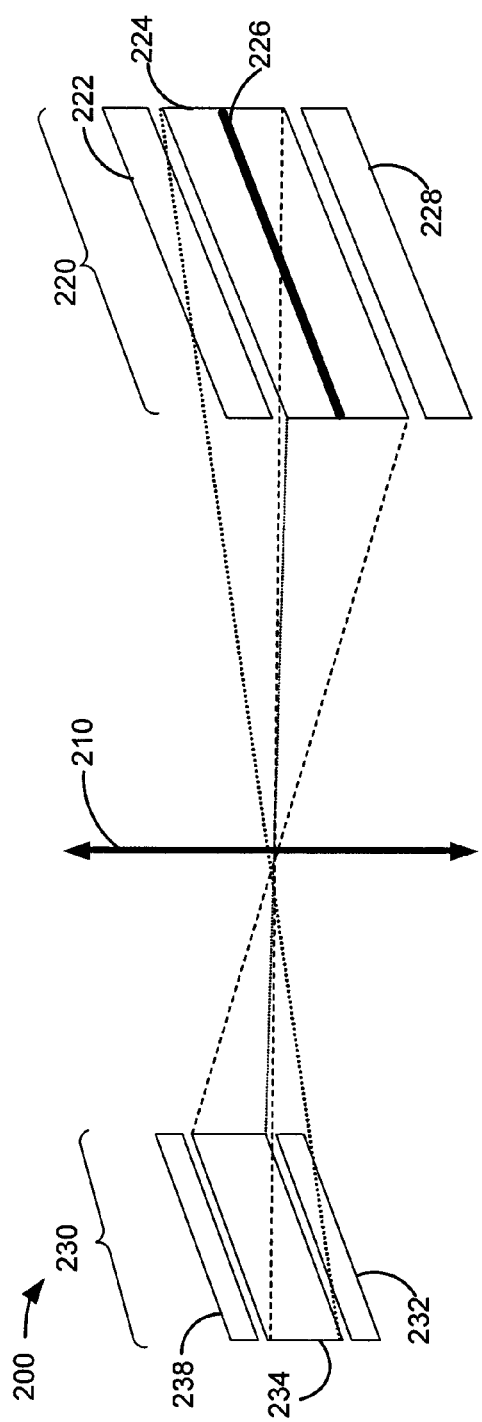
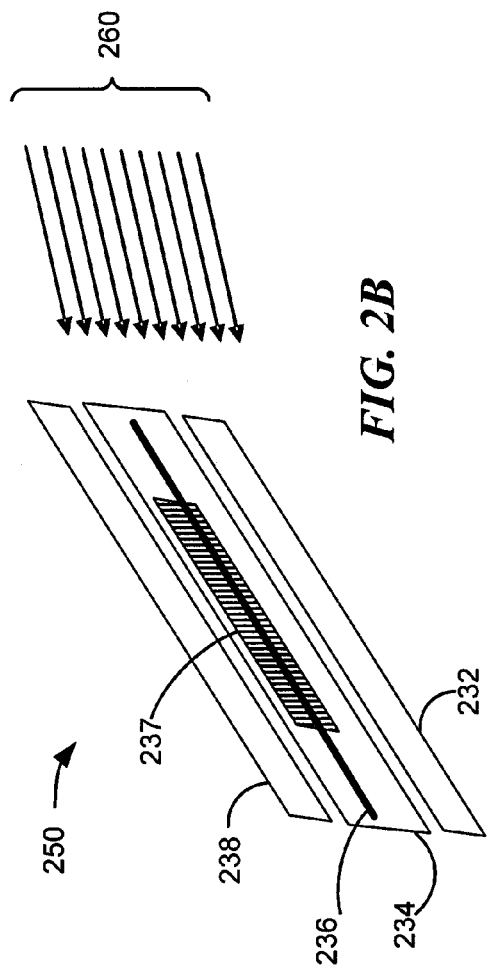
FIG. 2A
FIG. 2B

METHOD OF REDUCING NOISE IN AN OPTICALLY READ IMAGE USING AN OPTICAL COLLECTION DEVICE

CROSS REFERENCES

This application claims the benefit of U.S. Provisional Application No. 61/046,289, entitled "OPTICAL COLLECTION DEVICE UTILIZING DIFFERENTIAL AREA PHOTODIODES FOR REJECTING PARASITIC AMBIENT LIGHT AND MAXIMIZING RETROCOLLECTED MODULATED LASER LIGHT", filed Apr. 18, 2008, and is hereby incorporated by reference.

BACKGROUND

Conventional laser bar code readers scan a laser beam across a distant bar code label and detect an optical signal reflected off the bar code. However, ambient light, from sources such as low energy lights, neon signs, and sunlight, are also present in the detected signal. The frequency range of the ambient parasitic light is wide, ranging from DC to high frequencies. The ambient light component severely degrades the signal to noise ratio of the reflected bar code signal when the reading distance between the bar code reader and the bar code increases.

Retro reflection systems are well known in the art for extracting a signal from random noise. However, these systems are large, have low scanning frequencies, and are costly. Thus, they are not suited for use in handheld computers or bar code scanners.

There is a need for a system that overcomes the above problems, as well as providing additional benefits. Overall, the above examples of some related systems and associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 2A and 2B show an example of collection optics imaging a field of view.

DETAILED DESCRIPTION

Described in detail below is a bar code reader that uses an optical collection system to image light onto differential area photodiodes. In a suitable example, three photodiodes may be used, including a first main photodiode that receives the laser bar code signal along with ambient light and two smaller photodiodes located on either side of the main photodiode that receive only the ambient light. In one example, the total of the active areas of the two smaller photodiodes is approximately equal to the active area of the main photodiode.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

A bar code reader includes optics for focusing a laser beam and scanning it across a bar code and optics for collecting the laser light reflected off the bar code. The collection optics are designed to optimize the field of view, maximize the collection area, and collect the light on a photodetector. However, parasitic ambient light is present on and around the area near a bar code. The ambient light may have both a DC and a modulated frequency component. When modulated ambient light is superimposed upon the laser light reflected off a bar code, the signal to noise ratio at the photodetector of the bar code signal is degraded, especially when the reading distance between the bar code and the bar code reader increases. To improve the bar code signal, the bar code reader may capture the ambient light near the bar code and subtract it from the light reflected from the bar code that includes ambient light.

Conventional laser bar code readers, either retro reflective or fixed collective, detect reflected light at a point location. Alternatively, a mirror sends reflected light to a point detector, or a collective optic focuses reflected light onto a point detector. In both of these cases, it is impossible to remove ambient light with an additional detector because there is no image of the indicia, and illumination light rays reflected from the indicia would be collected in both light detecting photodiodes.

Figure 1:
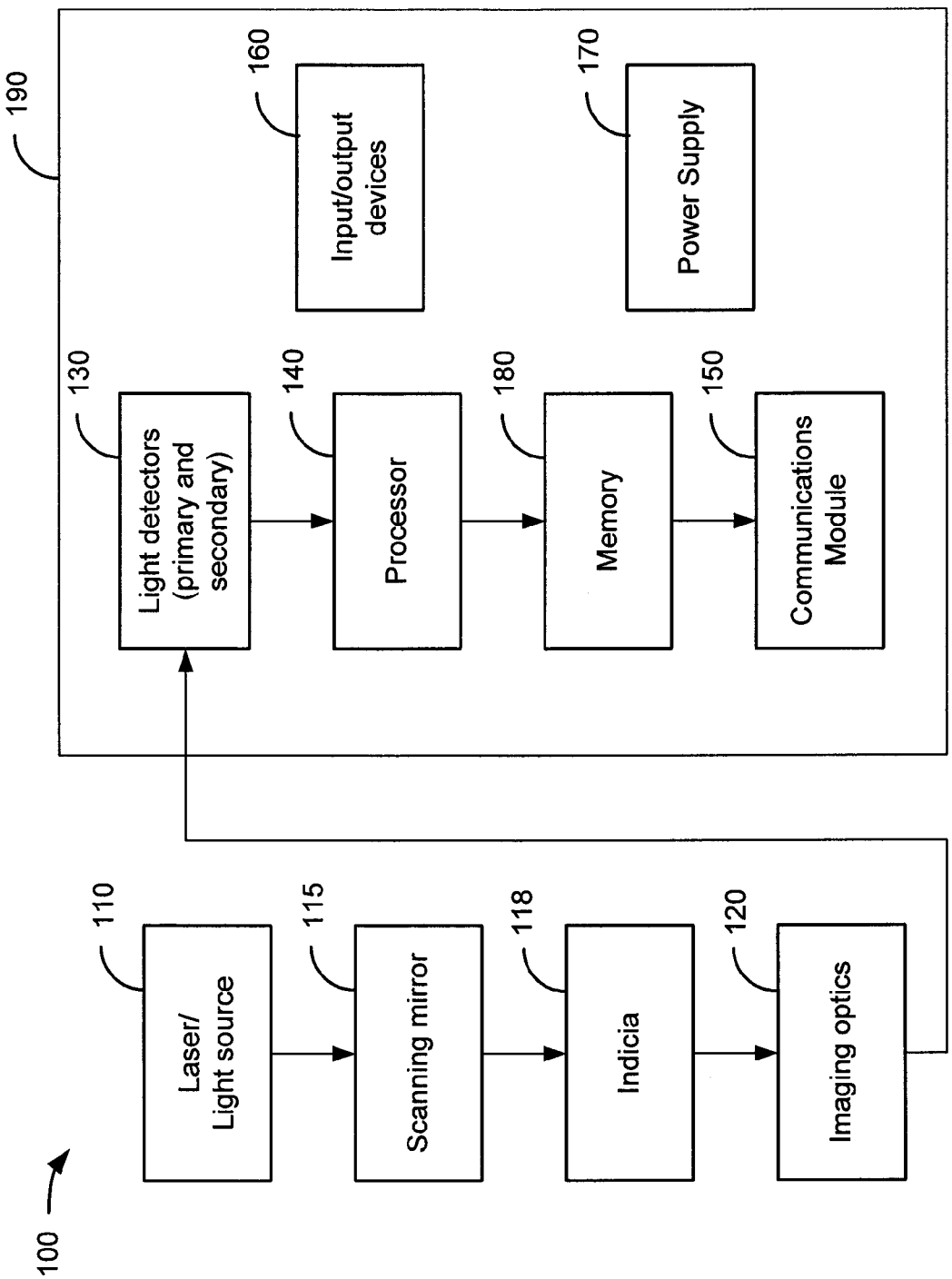
FIG. 1 shows a system block diagram of a bar code reader.

FIG. 1 shows an example block diagram 100 of a bar code reader used to read bar codes or other indicia at a distance. A bar code reader may include one or more light sources 110, a scanning mirror 115, imaging optics 120, and bar code reader electronics 190.

The light sources 110 include light source means such as laser diodes, solid state lasers, light emitting diodes (LEDs), incandescent bulbs, halogen lamps, and gas discharge lamps. A focused light source 110 such as a laser may be used for illuminating a bar code. Alternatively, a non-laser light source 110 may be used to illuminate a bar code in the present invention, provided the light source is sufficiently focused. A scanning mirror 115 may be used to scan the laser 110 across a bar code or other indicia 118, and imaging optics 120 may be used to collect the laser light reflected from a first area surrounding and including the bar code 118 onto a primary light detector 130. Alternatively, the scanning mirror 115 may be shaped to provide the functionality of the imaging optics 120. The imaging optics 120 also image light from one or more areas near, but should not be overlapping, the first area onto one or more secondary light detectors 130. The secondary light detectors 130 do not receive any light reflected from the bar code 118.

The bar code reader electronics 190 may include one or more light detectors 130, processors 140, memory units 180, communications modules 150, input/output devices 160, and power supplies 170.

The light detectors 130 include light sensing means such as photodiodes, PIN diodes, photodetectors, photoconductors, charge-coupled devices (CCD) that can convert an optical signal into an electrical signal. A processor 140 may be used to decode the electrical signals from the detectors 130. Memory units 180 may include, but are not limited to, RAM, ROM, and any combination of volatile and non-volatile memory. The memory units 180 may store the converted electrical Communications modules 150 may be used to transmit scanned bar codes either wirelessly or through electrical or optical cables to another device, a database, a memory unit, and/or a processor. Input/output devices 160 may include, but are not limited to, triggers to start and stop the bar code reader or to initiate other bar code reader functions, visual displays, speakers, and communication devices that operate through wired or wireless communications. Power supplies 170 may include, but are not limited to, a battery or an electrical wall outlet.

FIG. 2A shows an example imaging diagram 200 generated by collection optics 210 used by a laser bar code reader. The collection optics 210 may include, but are not limited to, a lens or a mirror, and a plurality of photodetectors. The collection optics 210 see a field of view 220. Three particular areas are delineated in the field of view 220, a top rectangular area 222, a middle rectangular area 224, and a bottom rectangular area 228. Within the middle rectangular area 224 lies a bar code (not shown) to be scanned. A laser in the bar code reader scans a line 226 in the field of view 220 in order to read the bar code. The sum of the areas of the top and bottom rectangular areas 222, 228 are approximately equal to the area of the middle rectangular area 224 in one example. Because parasitic ambient light is present throughout the field of view 220, and the intensity of the ambient light is essentially spatially independent, the total ambient light to which the top and bottom rectangular areas 222, 228 are exposed is approximately equal to the ambient light to which the middle rectangular area 224 is exposed.

The collection optics 210 image the field of view 220 onto an image plane 230. The top rectangular area 222 in the field of view 220 is imaged to area 232, the bottom rectangular area 228 in the field of view 220 is imaged to area 238, and the middle rectangular area 224 in the field of view 220 is imaged to area 234 in this example. Three separate photodiodes may be used in the image plane 230 with active areas covering each of the areas 232, 234, 238.

Alternatively, a non-laser light source may be used to illuminate the bar code as long as the light source is focused to illuminate only the rectangular area 224 around the bar code and not the neighboring areas 222, 228. If the bar code is not entirely contained within the rectangular area 224, the light source must still be focused to stay within the rectangular area 224. In another example, a scanning mechanism may use optics to spread light from a light source, such as a laser, into a narrow line of light and project the line of light onto the bar code, while remaining entirely within the area 224. It is important that the light be confined within the area 224 because the light source must not illuminate the photodiodes 232, 238 that sense ambient light from, respectively, the top and bottom rectangular areas 222, 228 in the field of view 220.

FIG. 2B shows an expanded diagram 250 of the image plane 230. Because the parasitic ambient light is evenly distributed over the field of view 220, upon imaging by the collection optics 210, the parasitic ambient light 260 is also evenly distributed in the imaging plane 230. The line 226 scanned by the laser in the field of view 220 is imaged as line 236. Also shown in the image plane 230 is the image of the bar code 237 scanned by the laser. Note that the bar code image 237 and the image of the laser scan line 236 are both contained in the area 234 and do not overlap the adjacent areas 238, 232. It will be apparent to a person skilled in the art that the collection optics 210 may magnify or shrink the field of view 220 as it is imaged onto the image plane 230, but the ratio of the dimensions of the areas 222, 224, 228 is substantially maintained in the image plane 230. Each of the three photodiodes 238, 234, 232 in the image plane 230 converts the light impinging upon its surface into an electrical current. Thus, due to the fidelity of the image plane, all three photodiodes receive and convert parasitic ambient light, but only the photodiode covering area 234 receives and converts the laser signal reflected off the bar code.

Figure 3:
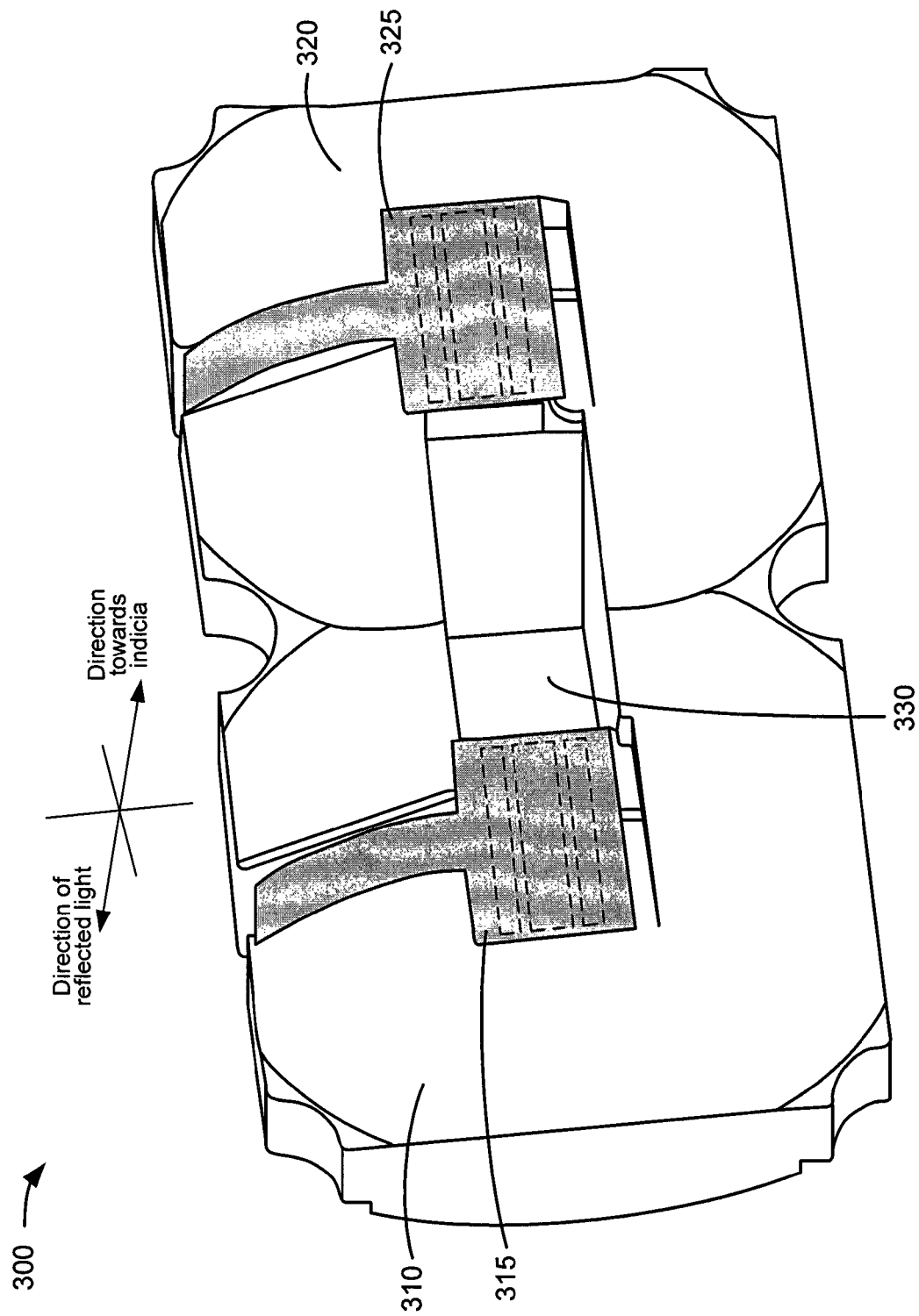
FIG. 3 shows an example of two adjacent collection optics with photodiodes mounted on flexible circuits.

FIG. 3 shows a front isometric view of a suitable example 300 of two juxtaposed optical collection imagers 310, 320. The optical imagers 310, 320 each have a concave mirror designed to maximize the collecting area, optimize the optical field, and focus light onto an image plane. A rectangular hole 330 between the two optical collection mirrors 310, 320 permits a laser beam to pass through. The arrows near the top of example 300 indicate that the bar code or indicia to be scanned is located towards the right side of the imagers 310, 320, and the light reflected from the bar code travels in the opposite direction. The laser from the bar code reader is scanned across a bar code, and the reflected light is focused and imaged by the mirrors 310, 320 onto photodiodes or other transducers that convert light to electricity located on the underside of flexible circuits 315, 325, as indicated by the dotted lines. It will be apparent to a person skilled in the art that although two optical collection imagers are used in example 300, any number of collection imagers may be used to image the laser light reflected off a bar code, such as one imager or three or more imagers.

Figure 4:
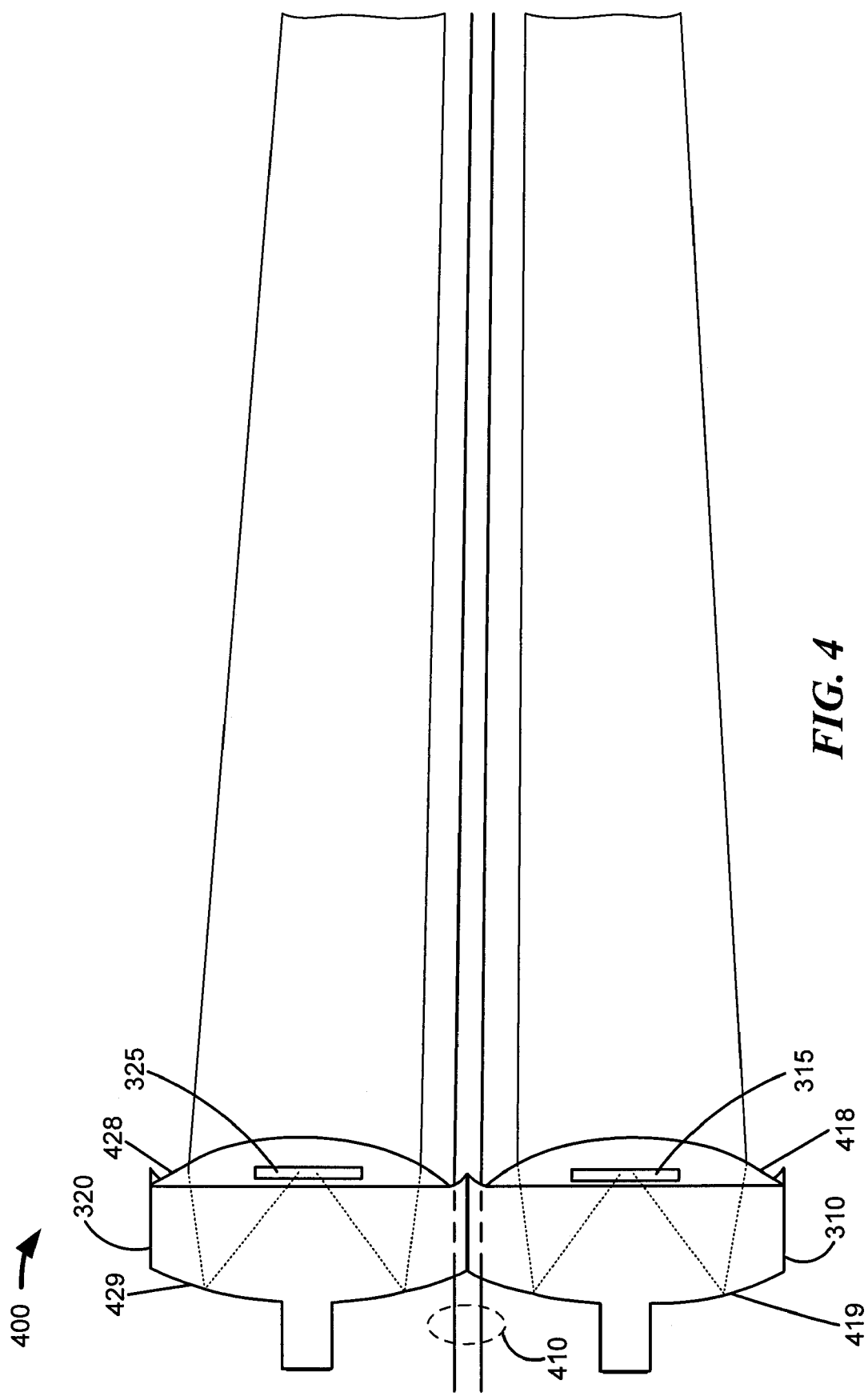
FIG. 4 shows a ray tracing diagram of laser light collected by two adjacent reflective optics.

FIG. 4 shows an example ray tracing diagram 400 of the example 300 having two juxtaposed optical collection imagers 310, 320. For clarity, the rays internal to the bundle of rays depicted in diagram 400 are not shown. A laser beam 410 is seen entering from the left side of the diagram. The laser beam passes through the hole 330 (not visible) between the collection optics 310, 320. The laser beam then reflects off a bar code (not shown) beyond the right side of the diagram and travels back toward the collection optics 310, 320. The reflected laser signal is transmitted through the front surfaces 418, 428 of the collection optics 310, 320 and then reflects off the back surfaces 419, 429 of the collection optics 310, 320 before striking the photodiodes located on flexible circuits 315, 325.

The optical collection imagers 310, 320 in FIGS. 3 and 4 use mirrors to fold the reflected rays within a compact space. Alternatively, the optical collection imagers 310, 320 may use lenses rather than mirrors where the photodetectors are positioned on the opposite side of the lens from the bar code or other indicia.

Figure 5:
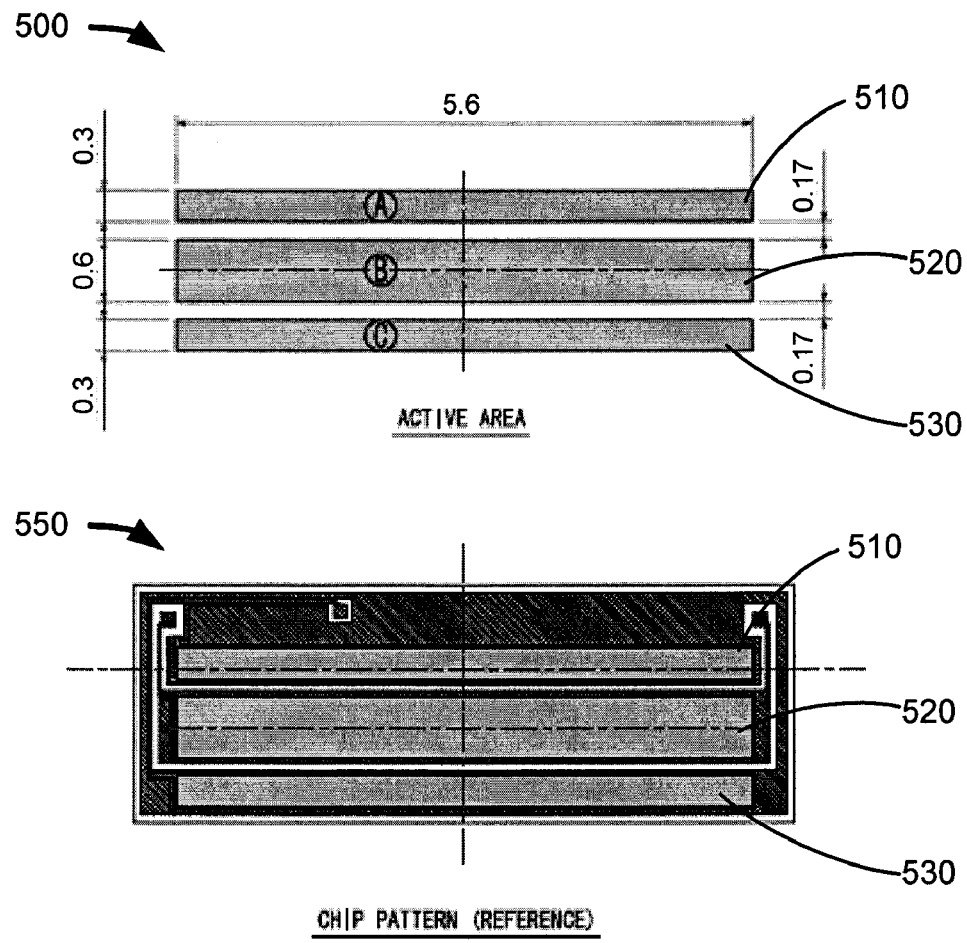
FIG. 5 shows an example of the active areas of the photodiodes used with the present invention.

FIG. 5 shows suitable, relative dimensions of the active areas of the photodiodes used in a suitable optical sensor 500 with the example 300 and the resulting pattern of the photodiodes on a photodiode chip 550. Two of the sensors 500 are used with the example 300, one on each of the flexible circuits 315, 325. There are three photodiodes 510, 520, 530 in the sensor 500, similar to the photodiodes described in diagram 250. In this example, the middle photodiode 520 is the only one of the three photodiodes to receive the laser signal reflected off the bar code, but all three photodiodes 510, 520, 530 receive the parasitic ambient light. The lengths of the three silicon photodiodes 510, 520, 530 are approximately equal, having a length of 5.6 mm in the prototype. However, while the width of the middle photodiode 520 is 0.6 mm, the widths of each of the top 510 and bottom 530 photodiodes are 0.3 mm. Thus, the area of the middle photodiode 520 that receives the laser signal is approximately the same as the total of the areas of the top and bottom photodiodes 510, 530 that only receive the parasitic ambient light.

Figure 6:
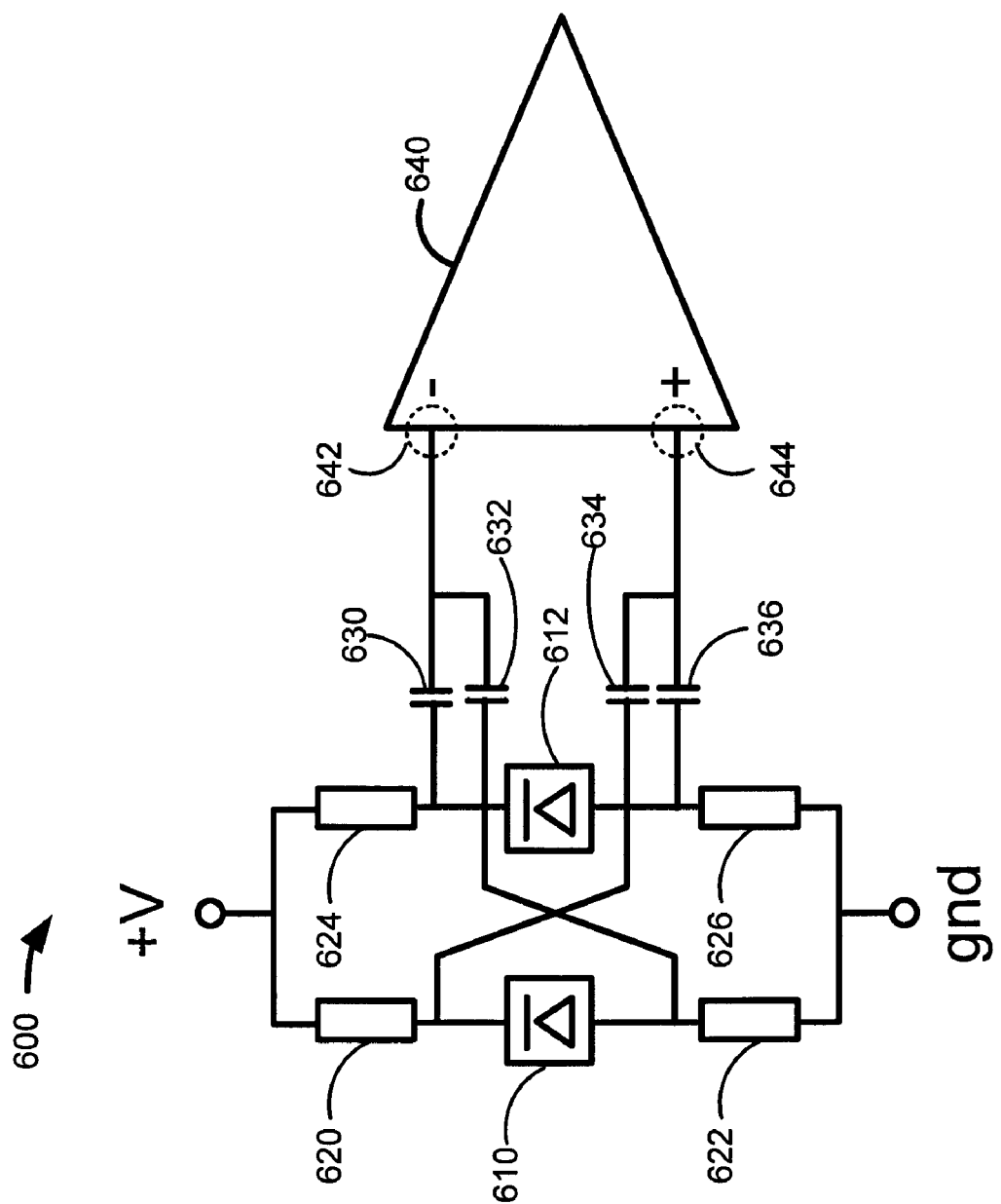
FIG. 6 is a circuit diagram showing an example of an electronic circuit used to remove the parasitic ambient light from a detected laser bar code signal.

Electric current generated by photodiode 520 has two components, current from the reflected laser signal and current from the ambient light. Because the active area of photodiode 520 is approximately equal to the sum of the active areas of the photodiodes 510, 530, the current generated by photodiode 520 due to the ambient light is approximately equal to the total current generated by the ambient light by photodiodes 510, 530. The example electrical circuit 600 shown in FIG. 6 may be used to subtract out or remove the current component generated by the ambient light from the current component generated by the laser bar code signal at photodiode 520 to obtain just the desired bar code signal. In one example, the currents generated by the two photodiodes 510, 530 are combined, and the two photodiodes 510, 530 are represented by a single photodiode circuit element 612 in the circuit diagram 600. The photodiode 520 is represented by the photodiode circuit element 610. Note that two of the electrical circuits 600 will be used with the example 400, one for each set of three photodiodes on the flexible circuits 315, 325, and the outputs of the two circuits 600 are combined. In a different example, the current from the two middle photodiodes would be combined, and the currents from the two top photodiodes and the two bottom photodiodes would also be combined; the latter currents would then be subtracted from the former currents using a single electrical circuit 600.

Both photodiode circuit elements 610, 612 are DC-biased through resistors, transistors, or impedance elements 620, 622, 624, 626. The currents of the photodiode elements 610, 612 pass through the capacitors 630, 640, 650, 660 located near the input terminals of the amplifier 640. Consequently, unwanted parasitic current generated by the photodiode 520 (or equivalently the photodiode circuit element 610) is effectively amplified and cancelled electronically at the output to the amplifier 640 without the introduction of any additional noise or the use of any other amplifiers or circuits that might decrease the signal to noise ratio. Moreover, because the same optical collector operates upon the same local field, the efficiency of the cancellation of the parasitic ambient light is maximized.

It should be noted that the amount of current generated by parasitic ambient light actually removed from the current generated by the photodiode 520 by circuit 600 depends upon the level of the signal detected by the photodiode 520 relative to the levels of the signals detected by the other photodiodes 510, 530, and the signal detected by the photodiodes 510, 520, 530 depends upon the spatial efficiency of the optical collection imagers used to image the light onto the photodiodes and the surface reflection coefficients of the bar code and the area near the bar code. For the dimensions of the photodiodes in the prototype 500, where the photodiodes 510, 530 are approximately half the width of the photodiode 520, spatial efficiency variations are very small. Also, typically the surfaces above and below the bar code usually have the same reflection coefficient as the bar code itself. Thus, the configuration of the photodiode prototype 500 may be a preferred implementation in certain situations.

Figure 7:
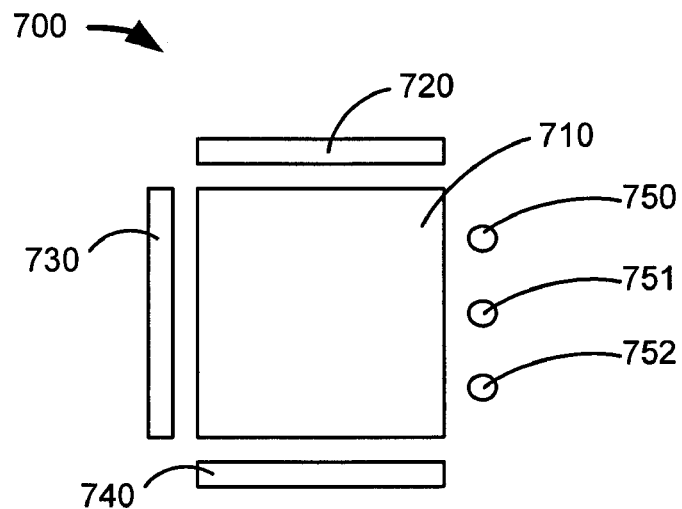
FIG. 7 shows an example of an alternative sensor configuration.

It will be apparent to a person skilled in the art that other dimensions and configurations of the photodiode active areas and/or different ratios of the width to the length of the photodiode active areas may be used. For example, in FIG. 7, an alternative sensor configuration 700 is shown. A bar code or other indicia may be raster scanned by a laser onto a two-dimensional sensor 710 located on the image plane. The two-dimensional sensor 710 may be a CMOS-based sensor. The two-dimensional sensor 710 may be surrounded by smaller area photodetectors 720, 730, 740 or point photodetectors 750, 751, 752 that collect ambient light without collecting the laser light reflected from the bar code. It will also be apparent that any number of photodiode areas used for imaging ambient light may be used in conjunction with the photodiode area imaging the laser light reflected off the bar code, following the guidelines given above with respect to the surface area, spatial efficiency, and reflection coefficients. Also, the active areas of the detectors for detecting the laser signal and for detecting just parasitic ambient light need not be equal, but other electrical or optical accommodations would be necessary. Further, other electrical circuit configurations may also be used to cancel the photodiode current generated by the parasitic ambient light.

Figure 8:
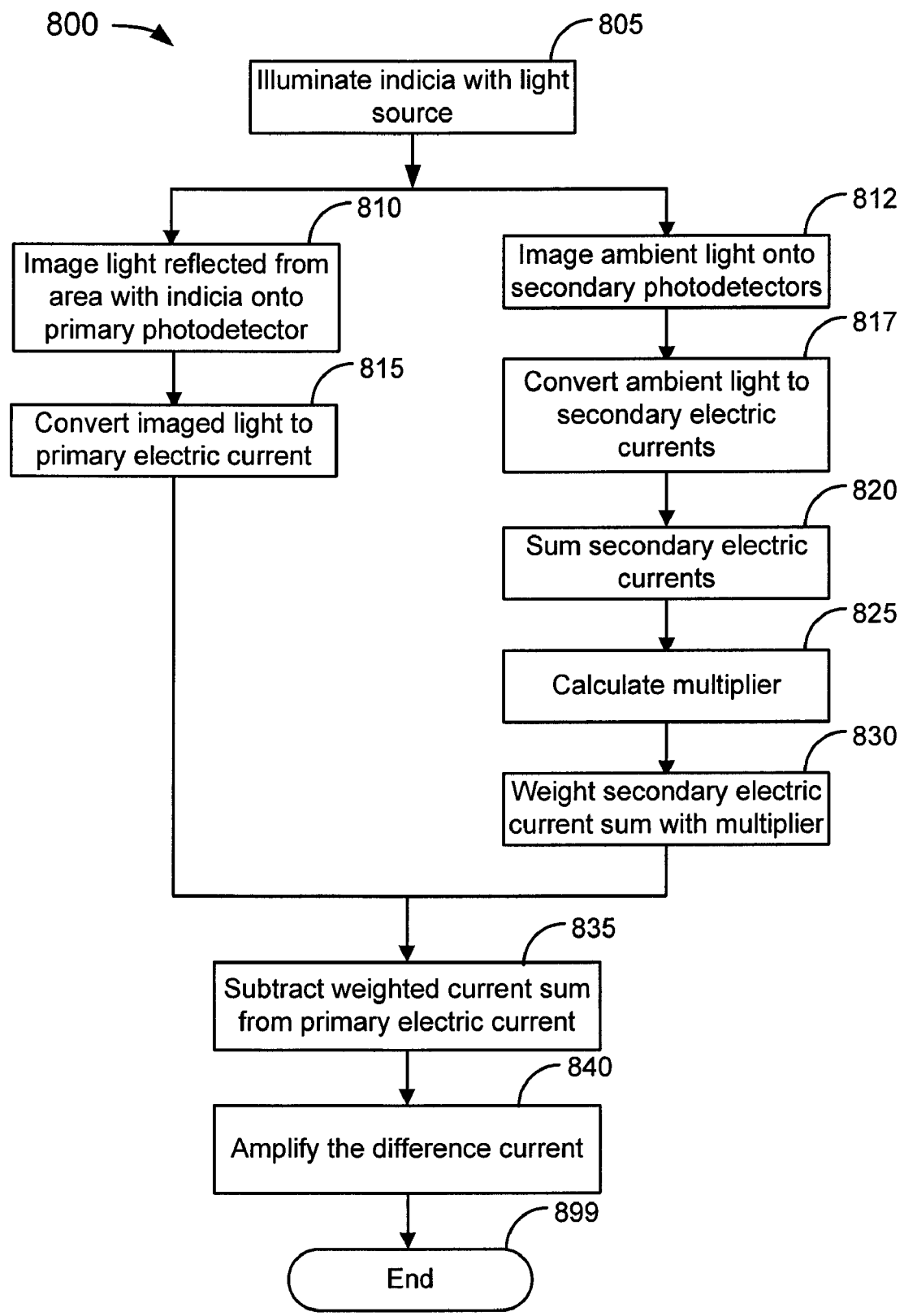
FIG. 8 depicts a flow diagram illustrating a suitable process for reading an indicia and rejecting ambient light.

FIG. 8 depicts a flow diagram illustrating a suitable process 800 for reading an indicia and rejecting ambient light. At block 805, the system illuminates the indicia to be read with a light source. The light source can be either a laser or non-laser source. In one example, the light source can be focused and scanned over the indicia.

At block 810, the system images the light reflected from a first area immediately surrounding and including the indicia onto the active area of a primary photodetector using imaging optics. The light reflected from the first area includes light reflected from the indicia and also parasitic ambient light. Then at block 815, the primary photodetector converts the imaged light to a primary electric current.

In parallel to the imaging performed by the system at block 810, at block 812, the system can use the same imaging optics to image ambient light from one or more additional areas near the indicia that should not be overlapping the first area onto one or more secondary photodetectors. Because the ambient light is substantially spatially independent, the ambient light per unit area imaged from the first area is substantially the same as the ambient light per unit area imaged from the one or more additional areas near the indicia that do not overlap the first area. Note that if the system uses a non-laser source to illuminate the indicia, the non-laser source should be focused by the system such that no light from the source is imaged onto the secondary photodetectors.

Then at block 817, the secondary photodetectors each convert the ambient light that impinges on their respective active areas into secondary electric currents. A processor adds up all of the secondary electric currents generated by the secondary photodetectors at block 820.

At block 825 the system calculates a multiplier for weighting the summed secondary currents. The multiplier is calculated by dividing the active area of the primary photodetector by the sum of the active areas of the secondary photodetectors. In some instances, the multiplier can also be dependent upon the spatial efficiency of the imaging optics and/or the surface reflection coefficients of the indicia and the areas near the indicia. At block 830, the system weights the sum of the secondary electric currents obtained in block 820 by the multiplier obtained in block 825.

At block 835, the system subtracts the weighted secondary electric current sum from the primary electric current to obtain the electric current generated by the light reflected from the indicia, free of the influence of ambient light. At block 840, the system optionally amplifies the signal current for further processing. The process 800 ends at block 899.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while a laser bar code reader for reading bar codes is mentioned, any desired target indicia may be scanned or imaged under the principles disclosed herein, such as alphabetic, numeric, or CJK (Chinese, Japanese, Korean language character sets) characters. Further any specific numbers noted herein are only examples: alternative implementations may employ differing values or ranges.

The teachings of the invention provided herein can be applied to other systems, not necessarily the system described above. The elements and acts of the various examples described above can be combined to provide further examples.

While the above description describes certain examples of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A system, comprising:
    a light source configured to illuminate a first area, wherein the first area includes at least an indicia to be read, and ambient light is present on and around the indicia; and
    a subsystem, wherein the subsystem comprises:
        a first sensor having a first active area;
        one or more additional sensors each having one or more second active areas, wherein the one or more additional sensors together have a total active area;
        a collection optics configured to focus an image:
            a first light reflected from the first area onto the first active area of the first sensor, wherein the first reflected light includes a first portion of ambient light and light reflected from the indicia, and the first active area converts the first reflected light to a first electric current, and
            a second portion of ambient light from the one or more additional areas near the indicia onto the one or more second active areas of the one or more additional sensors, wherein the one or more second active areas convert the second portion of ambient light to one or more second electric currents; and
        a first circuit configured to produce an output current by subtracting a sum of all the second electric currents times a multiplier from the first electric current, wherein the multiplier is based at least upon a ratio of the first active area and the total active area.

2. The system of claim 1 wherein the one or more additional areas do not overlap the first area.

3. The system of claim 1, further comprising:
    at least one data memory component;
    a processor coupled among the light source, the subsystem, and data memory component, configured to control the light source and the first circuit;
    a power source configured to power the light source, the first sensor, the one or more additional sensors, the first circuit, the processor, and the memory; and
    a housing configured to enclose the light source, the subsystem, the processor, the memory, and the power source,
    wherein the light source is a laser source.

4. The system of claim 1, further comprising:
    one or more additional subsystems; and
    a second circuit configured to sum all output currents.

5. The system of claim 1 wherein the total active area is substantially equal to the first active area.

6. The system of claim 1 wherein the first electric circuit comprises:
    an operational amplifier having an inverting input and a non-inverting input;
    a first capacitor;
    a second capacitor;
    a third capacitor; and
    a fourth capacitor,
    wherein a first anode of the first sensor is coupled through the first capacitor to the inverting input, a first cathode of the first sensor is coupled through the second capacitor to the non-inverting input, one or more anodes of the one or more additional sensors are coupled through the third capacitor to the non-inverting input, and one or more cathodes of the one or more additional sensors are coupled through the fourth capacitor to the inverting input.

7. The system of claim 1 wherein the multiplier is further based upon a spatial efficiency of the collection optics.

8. The system of claim 1 wherein the multiplier is further based upon surface reflection coefficients of the indicia, the first area, and the one or more additional areas near the indicia.

9. The system of claim 1, further comprising:
    a focusing optics configured to focus an output from the light source;
    a scanning mechanism configured to spread the focused output from the light source into a narrow line of light to illuminate the indicia; and
    a projection optics configured to project the line of light onto the indicia,
    wherein the line of light is not projected out of the first area.

10. A system, comprising:
    a laser source;
    a scanning optics configured to raster scan an output from the laser source over an indicia to be read;
    an imaging optics configured to:

image the raster-scanned indicia onto a primary sensor having a two-dimensional active area, wherein the image of the raster-scanned indicia includes a first background light from a first area near the indicia, and image one or more secondary areas near the indicia onto one or more secondary sensors;

the primary sensor configured to convert the image of the raster-scanned indicia from the first area to a first electrical signal, wherein the primary sensor is located in an image plane of the imaging optics; and the one or more secondary sensors having one or more secondary active areas configured to:
 receive a second background light from the one or more secondary areas near the indicia, and
 convert the second background light to one or more second electrical signals, wherein the one or more secondary sensors do not receive light reflected from the indicia; and a circuit configured to:
 sum the one or more second electrical signals,
 weight the sum based at least upon a ratio of the two-dimensional active area and the one or more secondary active areas,
 subtract the weighted sum from the first electrical signal.

11. The system of claim 10 wherein the secondary sensors are point detectors.

12. The system of claim 10 wherein the secondary sensors are small area detectors.

13. The system of claim 10 wherein the secondary sensors are detectors having a narrow strip of active area.

14. A system, comprising:
a light source means configured to illuminate a first area, wherein the first area includes at least a bar code to be read, and ambient light is present on and around the bar code; and two subsystems, wherein each subsystem comprises:
 a collection optics configured to focus an image:
  a first light reflected from the first area onto a first active area of a first light sensing means, wherein the first reflected light includes a first portion of the ambient light and light reflected from the bar code, and
  a second portion of ambient light reflected from one or more additional areas near the bar code onto two additional light sensing means, wherein the one or more additional areas do not overlap the first area;
 the first light sensing means configured to convert the first reflected light to a first electric signal;
 the two additional light sensing means configured to convert the second reflected light to two second electric signals, wherein the two additional light sensing means each have a second active area that is substantially half of the first active area, a first one of the additional light sensing means is positioned above the first light sensor, and a second one of the additional light sensing means is positioned below the first light sensing means; and a circuit configured to mathematically manipulate the first and second electric signals to produce an output signal that filters the second electric signals from the first electric signal.

15. The system of claim 14 wherein the first active area is rectangular-shaped having a first length and a first width, and each of the second active areas are rectangular-shaped and have substantially the first length and substantially half the first width.

16. The system of claim 14 wherein the collection optics include at least one mirror.

17. The system of claim 14 wherein the collection optics include at least one lens.

18. A method of reading an indicia and rejecting ambient light, comprising:
receiving an imaging signal and an ambient signal, wherein the imaging signal corresponds to indicia information and a first portion of ambient light, and the ambient signal corresponds to a second portion of ambient light;
mathematically manipulating the imaging signal and the ambient signal to subtract a contribution of the first portion of ambient light from the imaging signal;
storing the output signal in a memory.

19. The method of claim 18 wherein mathematically manipulating the imaging signal and the ambient signal comprises weighting the ambient signal based at least upon a ratio of a first light conversion area that produced the imaging signal and a total of one or more second light conversion areas that produced the ambient signal, and further wherein the contribution of the first portion of ambient light is substantially given by the weighted ambient signal.

* * * * *